(12) United States Patent
Anton et al.

(10) Patent No.: US 8,907,302 B2
(45) Date of Patent: Dec. 9, 2014

(54) FLOW RECTIFIER FOR CLOSED PIPELINES

(75) Inventors: Hans-Joachim Anton, Bielefeld (DE); Madhukar Rapaka, Warangal (IN)

(73) Assignee: Xylem IP Holdings LLC, White Plains, NY (US)

( * ) Notice: Subject to any disclaimer, the term of this patent is extended or adjusted under 35 U.S.C. 154(b) by 5 days.

(21) Appl. No.: 13/878,058

(22) PCT Filed: Jul. 27, 2011

(86) PCT No.: PCT/EP2011/003759
§ 371 (c)(1),
(2), (4) Date: Jul. 18, 2013

(87) PCT Pub. No.: WO2012/045378
PCT Pub. Date: Apr. 12, 2012

(65) Prior Publication Data
US 2013/0320233 A1    Dec. 5, 2013

(30) Foreign Application Priority Data

Oct. 8, 2010   (DE) .......................... 10 2010 047 782

(51) Int. Cl.
| | |
|---|---|
| G01N 21/01 | (2006.01) |
| G01N 21/51 | (2006.01) |
| G01N 23/10 | (2006.01) |
| G01N 23/12 | (2006.01) |
| B01J 19/12 | (2006.01) |
| C02F 1/32 | (2006.01) |
| F15D 1/00 | (2006.01) |

(52) U.S. Cl.
CPC .............. B01J 19/123 (2013.01); C02F 1/325 (2013.01); *C02F 2201/3227* (2013.01); *C02F 2201/328* (2013.01); *C02F 2301/022* (2013.01); *F15D 1/001* (2013.01)

USPC ... 250/436; 250/455.11; 250/428; 250/432 R; 250/435; 250/438; 250/504 R

(58) Field of Classification Search
USPC ........ 250/455.11, 428, 432 R, 435, 436, 438, 250/504 R
See application file for complete search history.

(56) References Cited

U.S. PATENT DOCUMENTS 5,352,359 A    10/1994  Nagai et al.
6,976,508 B2 *  12/2005  Ueberall ........................ 138/39
(Continued)

FOREIGN PATENT DOCUMENTS

DE    101 01 816 A1    7/2002
EP    1 837 309 A1    1/2007
(Continued)

OTHER PUBLICATIONS

International Search Report, dated Apr. 9, 2013, corresponding to International Application No. PCT/EP2011/003759, filed Jul. 27, 2011.
(Continued)

*Primary Examiner* — Jack Berman
*Assistant Examiner* — Meenakshi Sahu
(74) *Attorney, Agent, or Firm* — RatnerPrestia

(57) ABSTRACT

A channel for a UV irradiation device, in which the UV irradiation device is disposed in a closed channel and an inlet cone is provided in the direction of flow upstream of a UV reactor, which, as part of the wall of the channel, increases the cross section of the channel from an incoming pipeline cross section to a cross section of the reactor, in which a flow rectifier with at least one inner first guide element and at least one outer second guide element is disposed in the inlet cone, wherein the inner guide element is a substantially circular, cylindrical pipe and the outer guide element runs substantially parallel to the outer wall and is disposed at a distance from the outer wall.

16 Claims, 15 Drawing Sheets

(56) References Cited

U.S. PATENT DOCUMENTS

| | | |
|---|---|---|
| 7,018,544 B2 | 3/2006 | Veenstra et al. |
| 7,592,607 B2 | 9/2009 | Sief et al. |
| 2002/0117631 A1 | 8/2002 | Gadgil et al. |
| 2004/0026337 A1* | 2/2004 | Veenstra et al. ............ 210/748 |

FOREIGN PATENT DOCUMENTS

| | | |
|---|---|---|
| JP | 9 276859 A | 10/1997 |
| WO | WO 2004/048274 A1 | 6/2004 |

OTHER PUBLICATIONS

International Search Report, dated Oct. 26, 2011, corresponding to International Application No. PCT/EP2011/003759, filed Jul. 27, 2011.

R. Iranpour, G. Garnas, O. Moghaddam, A. Taebi, Hydraulic Effects on Ultraviolet Disinfection: Modification of Reactor Design, Research Journal of the Water Pollution Control Federation, vol. 71, No. 1, Jan. 1, 1999, pp. 114-118.

* cited by examiner

FLOW RECTIFIER FOR CLOSED PIPELINES

CROSS-REFERENCE TO RELATED APPLICATIONS

This is a U.S. National Phase Patent Application of PCT International Patent Application Number PCT/EP2011/003759, filed Jul. 27, 2011, which claims priority benefit of German Patent No. DE 10 2010 047 782.6, filed Oct. 8, 2010, each of which is incorporated herein by reference in its entirety.

FIELD OF THE INVENTION

The present invention relates to a flow rectifier for closed pipelines.

BACKGROUND OF THE INVENTION

UV irradiation of flowing liquids is undertaken for various purposes, for example to disinfect drinking water and waste water, and to trigger chemical reactions which are enabled by the UV radiation. The UV dosage given to each volume element is always decisive for the desired effect of the UV radiation in the liquid. In disinfection applications, the microorganisms contained in the water are reliably disinfected only if a specific minimum dosage is applied to them. It is therefore necessary to set the radiation power in the system in such a way that the liquid volume with the shortest residence time or the lowest irradiation intensity reliably receives the required minimum dosage of UV radiation.

This means that, with a strongly inhomogeneous flow within the UV reactor, the slowly flowing volume elements receive too high a dosage, i.e. too much energy is expended in this area if the fastest-flowing volume elements are reliably to receive a dosage above the required minimum dosage. A substantial part of the operating costs of a system of this type for disinfecting drinking water is incurred by the power consumption of the UV radiators which are used. Efforts are made to design the flow through a UV reactor of this type to be as even as possible, so that all volume elements receive roughly the same radiation dosage.

Various solutions are proposed for this purpose. Systems exist which comprise elongated UV radiators of the mercury low-pressure radiator type, which are disposed parallel to the flow in the UV reactor. In these systems, the radiation is swirled, for example, by means of baffle plates, in such a way that all liquid volumes come into the vicinity of the radiators, thereby achieving a substantially even irradiation of the entire flowing liquid. These baffle plates increase the flow resistance of the system and reduce the possible liquid throughput. A device of this type is presented, for example, in the publication U.S. Pat. No. 5,352,359, which is incorporated by reference.

A different approach consists in the homogenisation of the flow within the UV reactor. To do this, static mixers are used to homogenise the speed distribution or the speed profile within the flow. A technical solution of this type is presented in the patent document U.S. Pat. No. 7,018,544 B2, which is incorporated by reference. This solution also increases the flow resistance. It is furthermore dependent on a flow entering in a roughly straight line with a rotationally symmetrical speed profile.

SUMMARY OF THE INVENTION

The present invention relates to a flow rectifier which, even in the case of a flow entering with a non-rotationally symmetrical speed profile, achieves a homogenisation of the speed distribution within the flow, and furthermore generates a low dynamic pressure.

Since an inlet cone, which, as part of the wall of the channel, increases the cross section of the channel from an incoming pipeline cross section to a cross section of the reactor, is provided in the flow direction upstream of the UV reactor, and since at least one inner guide element and one outer guide element are disposed in the inlet cone, wherein the inner guide element is a substantially circular, cylindrical pipe and the outer guide element runs substantially parallel to the outer wall and is disposed at a distance from the outer wall, an even speed distribution is achieved in the area of the UV reactor downstream of the flow rectifier. The outer guide element may have a circular cross section. It can also be provided for the outer guide element to be adapted to the shape of the inlet cone, i.e. in particular to provide a square or rectangular cross section with rounded corners or with rectangular corners.

In a preferred embodiment, a third guide element is also disposed between the first guide element and the second guide element. The wall of the third guide element is preferably aligned in relation to the axis of symmetry of the arrangement at an angle which lies between the first guide element and the second guide element. An arrangement in which the first guide element is shorter than the second guide element in the axial direction of the device corresponding to the direction of flow of the water is advantageous. Here, the upstream ends of the guide elements are preferably disposed in one plane, whereas the downstream ends of the guide elements lie in different planes. It can also be provided to select the axial extension of the guide elements as equally long.

BRIEF DESCRIPTION OF THE DRAWINGS

Exemplary embodiments of the present invention are described below with reference to the drawing, in which.

DETAILED DESCRIPTION OF EXEMPLARY EMBODIMENTS OF THE INVENTION

Figure 1:
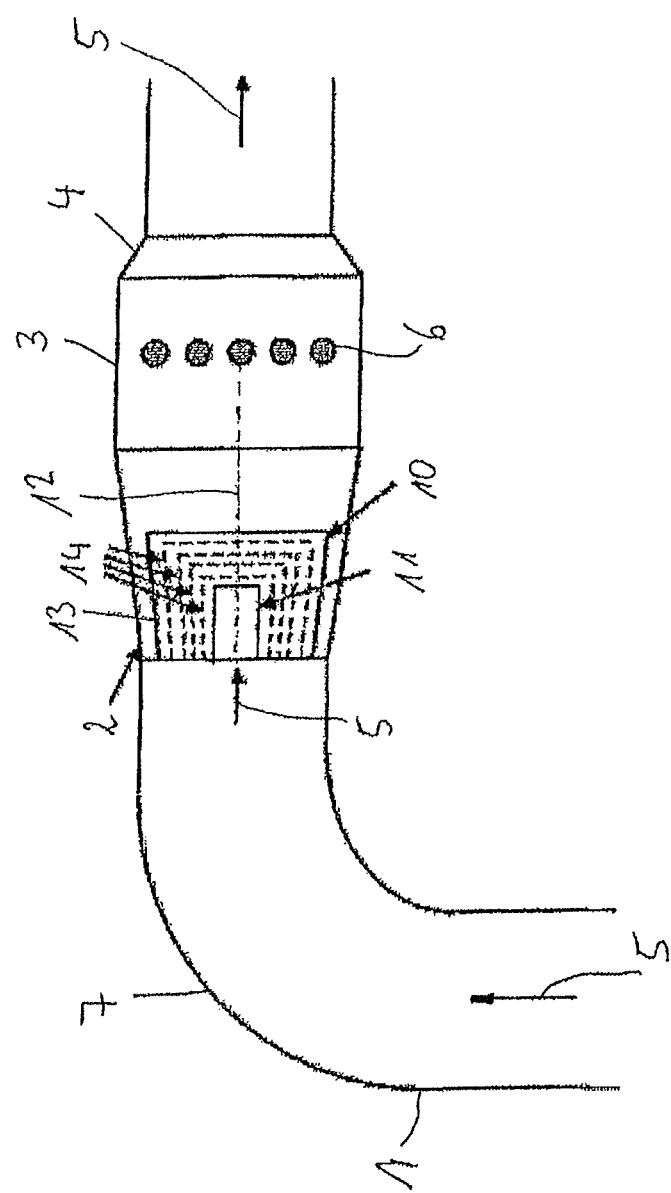
FIG. 1 shows a schematic representation of a UV reactor, installed in an irradiation channel with a deflection on the input side.

FIG. 1 shows a channel 1 with an inlet cone 2, a UV reactor 3 and an outlet cone 4 in a schematic representation. The channel 1 is normally designed as a stainless steel pipe with a rectangular or round cross section. The direction of flow runs in the direction of the flow arrows 5.

A plurality of UV radiators 6 is disposed in the UV reactor. The UV radiators 6 are disposed in the form of elongated medium-pressure mercury radiators or low-pressure mercury radiators perpendicular to the drawing plane and pass through the flow channel in the UV reactor 3 transverse to the direction of flow 5.

The channel 1 has a pipe bend 7 upstream of the inlet cone 2, which deflects the direction of flow 5 through 90°. At the entry of the inlet cone 2, the flow of the water in the channel 1 has a complex speed profile as a result of this deflection, comprising areas with a high flow speed and areas with a very low flow speed. A flow rectifier, which is denoted in its entirety as 10, is disposed in the inlet cone 2 in order to even out the speeds of the different flow paths. The flow rectifier 10 comprises an inner first guide element 11, which is designed as a cylindrical pipe with a constant diameter in the direction of flow 5, and which is disposed symmetrically to an axis of symmetry 12. The flow rectifier 10 furthermore comprises a second outer guide element 13. The guide element 13 is disposed radially between the first guide element 11 and the wall of the inlet cone 2. The second guide element 13 is designed as a conical tubular guide element, and upstream, i.e. facing the bend 7 in FIG. 1, has a smaller opening cross section than downstream, facing the UV reactor 3. The second guide element 13 can be designed as a round, truncated conical pipe. It can also be designed as a four-sided, truncated pyramid. The wall of the second guide element, which is normally made from stainless steel sheeting, runs substantially parallel to the wall of the inlet cone 2.

In the direction of the axis of symmetry 12, the upstream ends of the first guide element 11 and the second guide element 13 are disposed in the same plane, which corresponds to the plane of the input of the inlet cone 2. In the direction of the axis of symmetry 12 downstream, the first guide element 11 is shorter than the second guide element 13. The second guide element 13 is in turn shorter than the inlet cone 2, so that a free space is located between the downstream end of the second guide element 13 and the input of the reactor 13.

Further guide elements in the form of truncated conical or truncated pyramidal pipes, which are shown by dotted lines in FIG. 1 and are denoted by the reference number 14, can be disposed between the first guide element 11 and the second guide element 13. The third guide elements 14 are then designed with free cross sections extending in the direction of flow 5, wherein the angle of the wall in relation to the axis of symmetry 12 lies between 0 and the angle of the second guide element 13.

Figure 2:
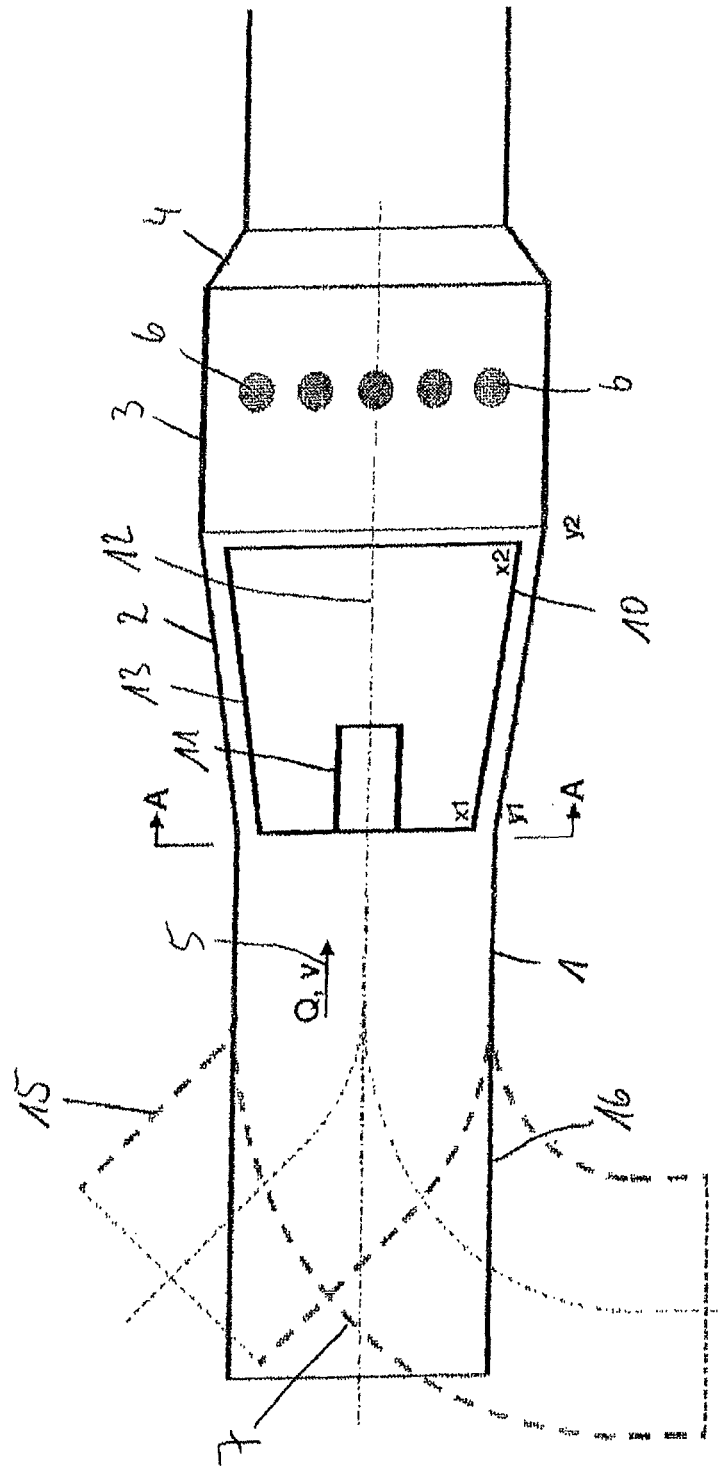
FIG. 2 shows a UV reactor similar to FIG. 1, with a straight inlet.

FIG. 2 shows an arrangement corresponding to FIG. 1 with different options for the channel 1 upstream of the flow rectifier 10. The pipe bend 7, which effects a deflection through 90°, is shown by dotted lines in this figure. Another embodiment comprises a pipe bend 15, which allows a deflection through around 45° and which is similarly shown by dotted lines. A preferred design provides for a pipe connection 16, which leads towards the inlet cone 2 without a change of angle. However, the flow rectifier 10, which is disposed in the inlet cone 2, also effects a substantially even flow on the radiators 6 in the UV reactor 3 in the designs with a pipe bend 7 or a pipe bend 15.

Figure 3:
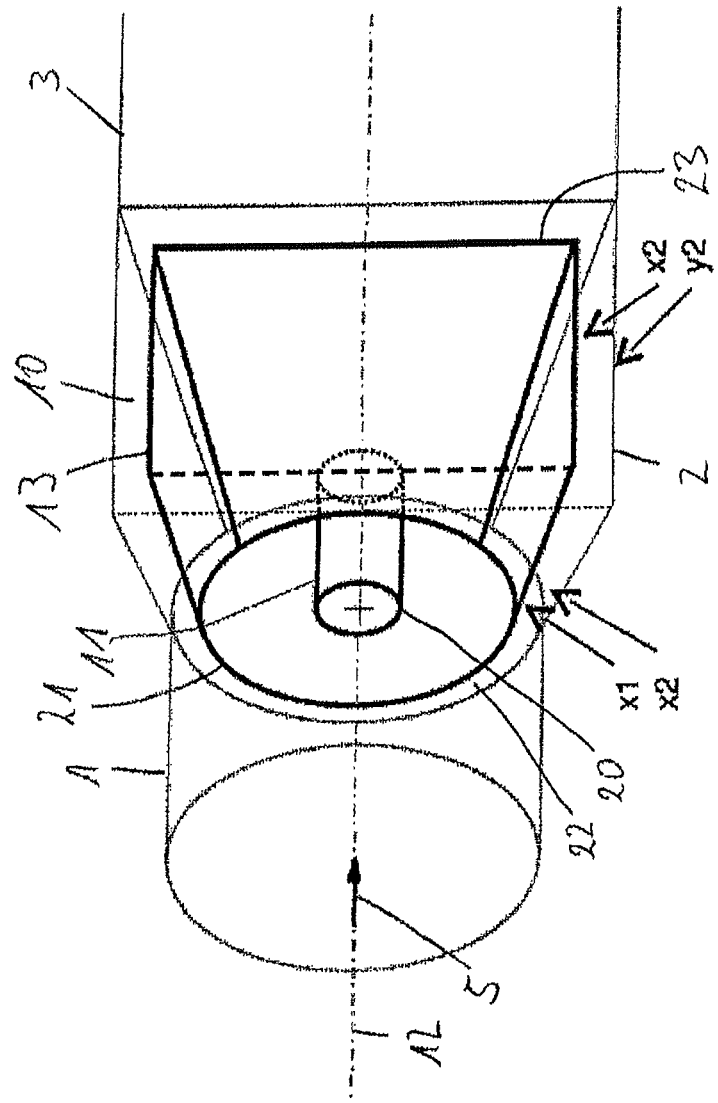
FIG. 3 shows a top view of the flow rectifier from FIG. 2.

FIG. 3 shows a top view of the area of the inlet cone 2 with a direction of view oblique to the upstream side of the flow rectifier 10. Identical components are denoted by the same reference numbers. In this top view, it is recognisable that the upstream side of the flow rectifier 10 has an inner, circular opening cross section 20 of the first guide element 11 and a similarly circular free cross section 21 of the second guide element 13. The two opening cross sections 20 and 21 are disposed concentrically in relation to one another. An annular gap 22, through which the flow 5 can similarly pass, is located outside the larger opening cross section 21 between the second guide element 13 and the inlet cone 2. In the direction of flow downstream of the opening cross section 20, the first guide element 11 is designed as tubular with a constant diameter. Downstream of the opening cross section 21, the second guide element 13 is provided with an increasing free cross section, wherein the initially circular cross section shape gradually changes into a square cross section shape, which follows at a distance the contour of the inlet cone 2 which is similarly provided with a square cross section.

Figure 4:
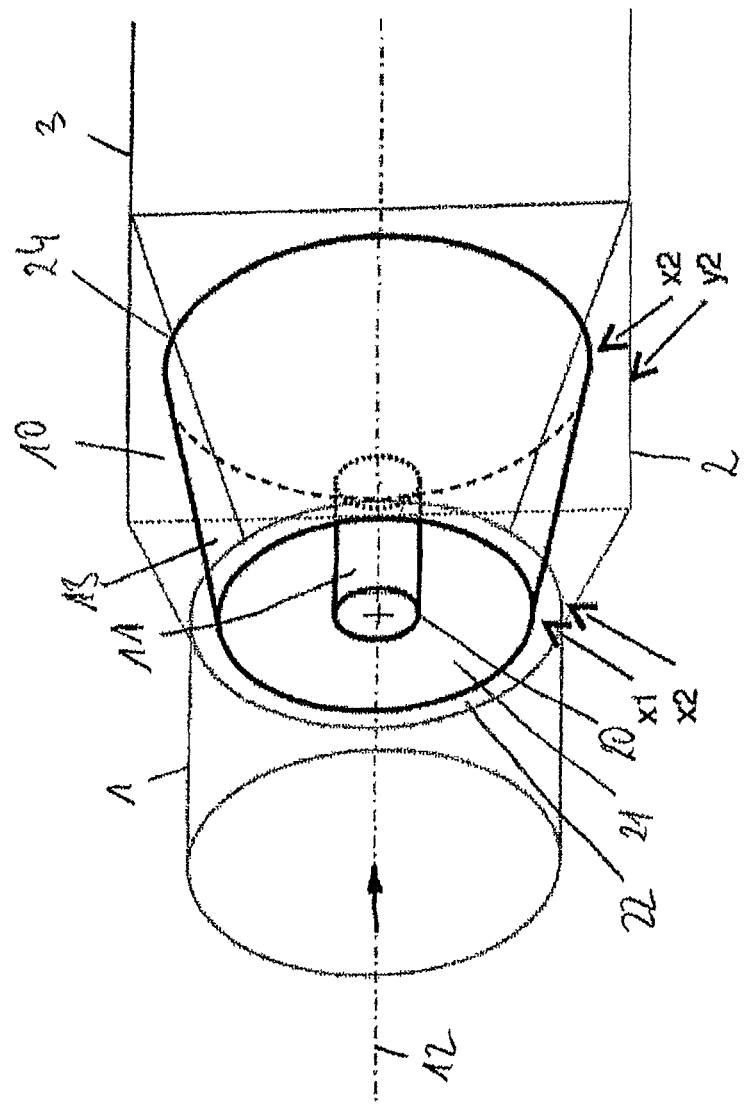
FIG. 4 shows a variant of the flow rectifier from FIG. 2, with a round outer guide element.

FIG. 4 shows a different variant of the flow rectifier 10 disposed in the inlet cone 2. The presentation corresponds to that of FIG. 3. In contrast to FIG. 3, where the cross section of the second guide element 13 changes from a circular opening cross section 21 on the upstream end to a square opening cross section on the downstream end, the second guide element 13 is designed in this embodiment in the shape of a truncated cone. The outer surface extends from a circular opening cross section 21 to a larger, similarly circular cross section 24, which is attained on the downstream end of the second guide element 13. The inner cross section of the second guide element 13 remains circular over the entire length. This design produces a gap, which has no constant gap width over the circumference, between the second guide element 13 and the inner wall of the inlet cone 2. This is not a significant disadvantage for the function of the device.

Figure 5:
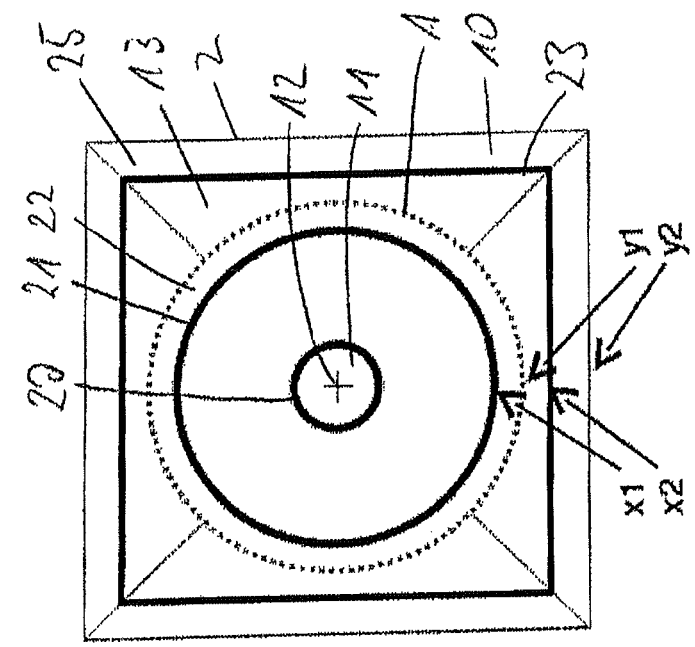
FIG. 5 shows a flow rectifier with three elements in a first variant.

FIG. 5 shows a front view of the downstream side of the flow rectifier from FIG. 3. The first guide element 11 is shown in this direction only as a circle, since the cross section is constant over the longitudinal extension in the direction of the axis 12. Clearly recognisable in this presentation, the second guide element 13 has the opening cross section 21 in the entry side which is circular and smaller in diameter than the cross section of the channel 1. The annular gap 22 is formed between the opening cross section 21 and the channel 1. Downstream, the second guide element 13 has the square opening cross section 23, which similarly presents a distance 25 from the outer wall of the inlet cone 2.

Figure 6:
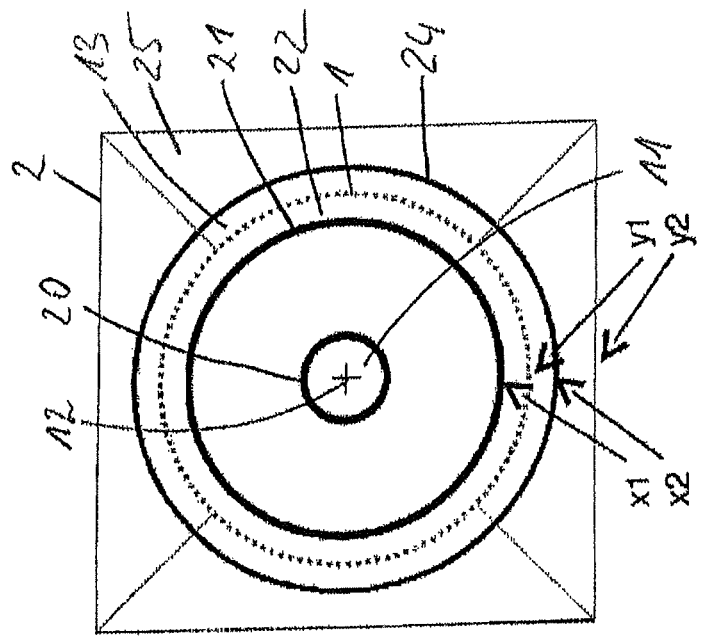
FIG. 6 shows a flow rectifier with three guide elements in a second variant.

FIG. 6 shows the corresponding front view of the flow rectifier 10 from FIG. 4. The first guide element 11 is in turn provided with a constant diameter in the direction of the axis 12 and represents the opening cross section 20. The second guide element 13 is provided with the upstream opening cross section 21 and the downstream, larger opening cross section 24. The annular gap 22 is formed on the input side of the inlet cone 2 between the second guide element 13 and the wall of the inlet cone 2. A gap 25, which does not have a constant width over the circumference of the device is formed on the downstream side between the second guide element 13 and the wall of the inlet cone 2.

Figure 7:
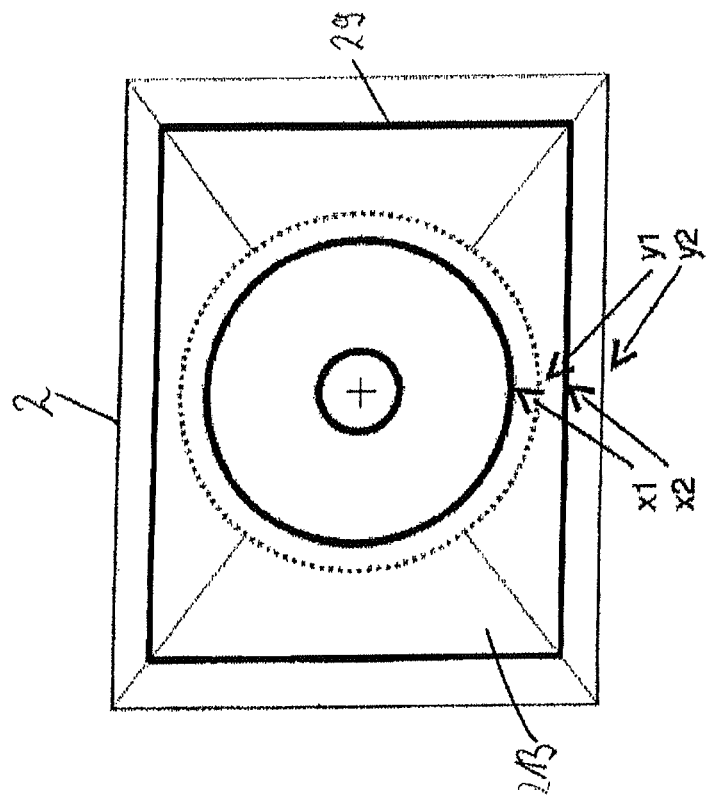
FIG. 7 shows a flow rectifier with three guide elements in a third variant.

FIG. 7 shows a variant of the flow rectifier 10 from FIGS. 5 and 6, which represents a compromise between the two variants from FIGS. 5 and 6. Whereas in FIG. 5 the gap 25 between the second guide element 13 and the wall of the inlet cone 2 has a constant clearance over the circumference, the gap between the first guide element 11 and the second guide element 13 is not provided with a constant clearance in the circumferential direction. On the other hand, in the design according to FIG. 6, the gap between the first guide element 11 and the second guide element 13 is constant over the circumferential direction, whereas the outer gap 25 between the second guide element 13 and the wall of the inlet cone 2 is not constantly wide in the circumferential direction. In FIG. 7, this effect, which occurs only in the transition from round pipelines to rectangular or square reactor housing, is optimised by a compromise. On the inflow side upstream of the inlet cone 2, the arrangement is identical to the solutions from FIG. 5 and FIG. 6. In the downstream direction, the second guide element 13 extends in the cross section to an exit cross section 26, which has straight wall sections 27 parallel to the wall of the inlet cone 2, and which has rounded areas 28 on the corner areas of the inlet cone 2 between the straight wall sections 27. As a result of this cross section design, the inner gap and the outer gap do not have a constant width in the circumferential direction, but the differences over the circumference are minimised.

Figure 8:
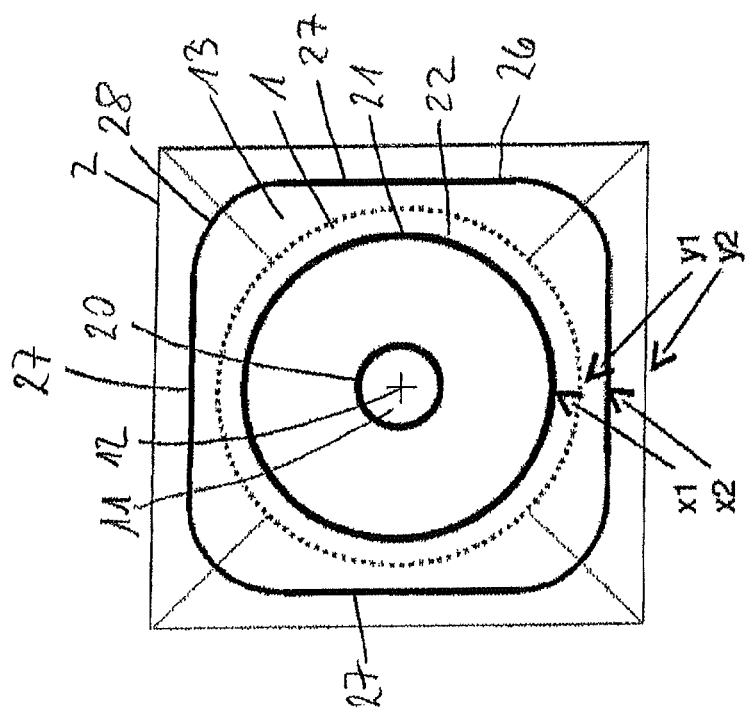
FIG. 8 shows a flow rectifier with three guide elements in a fourth variant.

FIG. 8 shows a representation corresponding to FIG. 5, wherein the inlet cone 2 is not designed with a square cross section, but with a rectangular cross section for connection to a correspondingly rectangular reactor 3. In this embodiment, the free cross section of the second guide element 13 extends from a round entry cross section to a rectangular, larger exit cross section 29.

Figure 9:
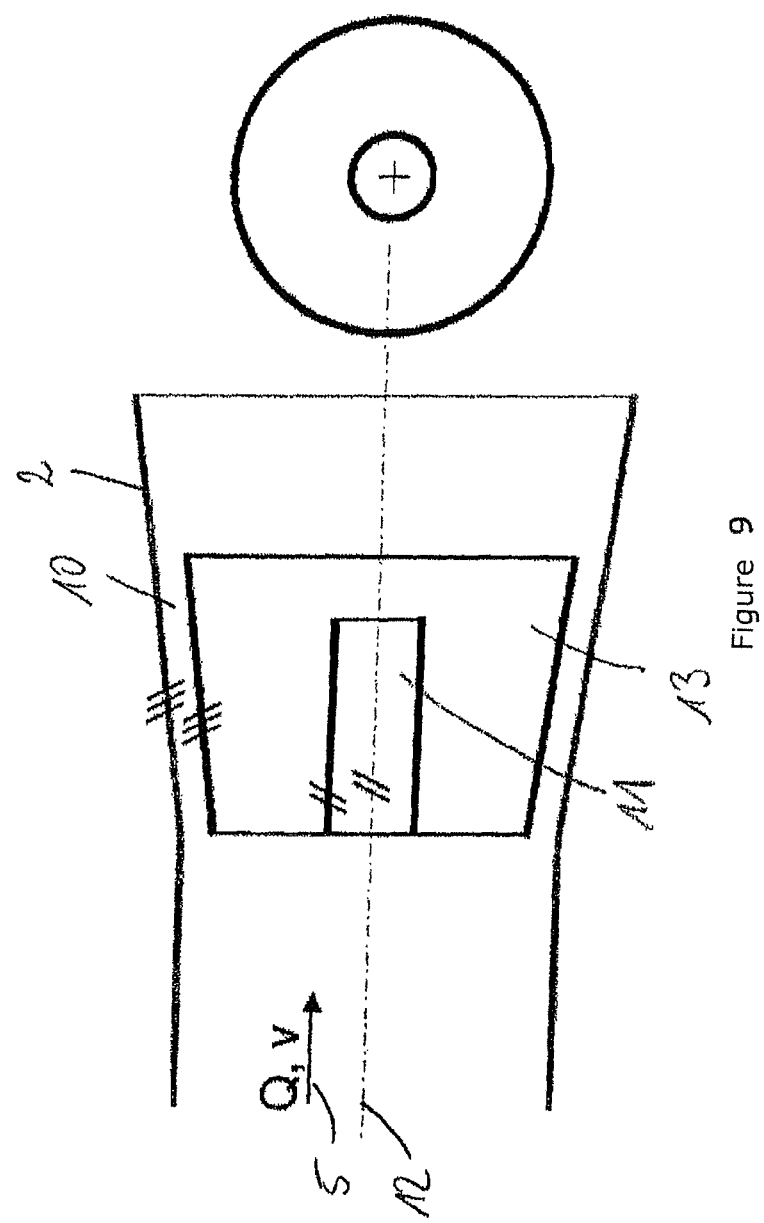
FIG. 9 shows a side view and a front view of a flow rectifier with two guide elements.

In FIGS. 9-13, different configurations of flow rectifiers are shown which differ in terms of the lengths of the first guide elements 11 and the second guide elements 13, the angles of the guide elements in relation to the axis 12, and the number of guide elements. FIG. 9 shows, in a cross section and in a front view, a flow rectifier 10, in which the first guide element 11 is aligned cylindrically with a wall parallel to the axis 12. As described in relation to FIG. 4, the second guide element 13 is longer in the axial extension of the axis 12 than the first guide element 11. The wall of the second guide element 13 is oriented parallel to the wall of the inlet cone 2.

Figure 10:
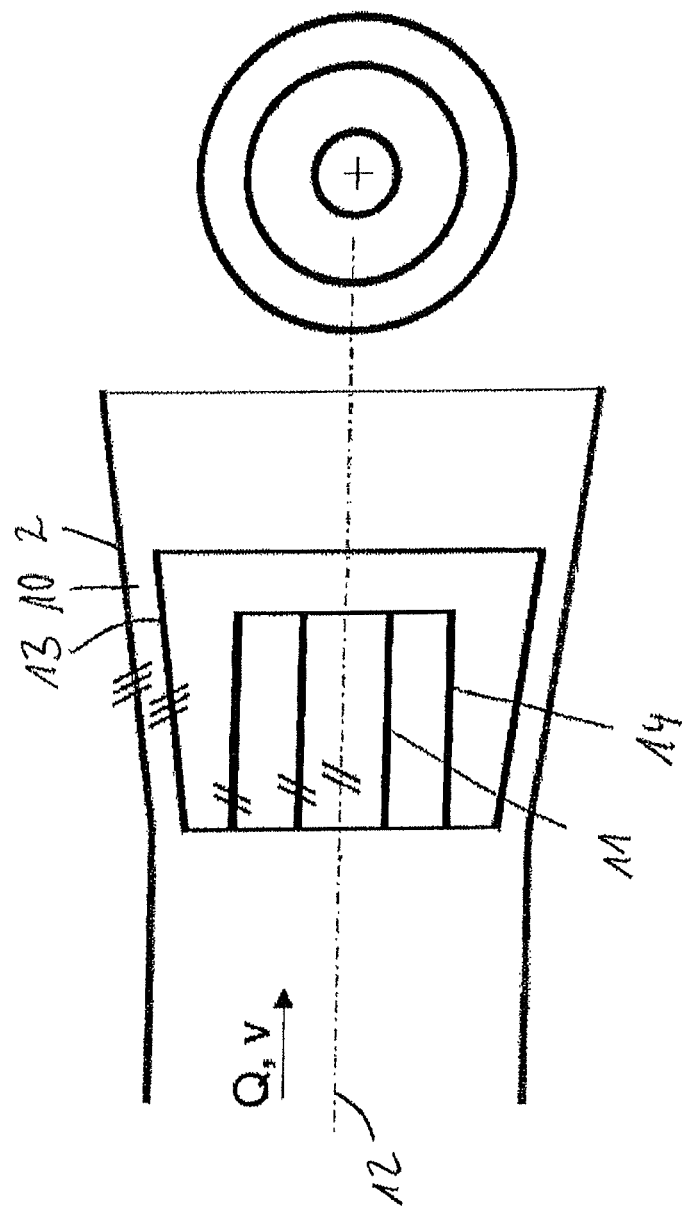
FIG. 10 shows a side view and a front view of a flow rectifier with three guide elements.

In FIG. 10, as in FIG. 9, the first guide element 11 is parallel to the axis 12. Similarly as in FIG. 9, the second guide element 13 is longer than the first guide element 11 (in the downstream direction) and is aligned parallel to the wall of the inlet cone 2. A third guide element 14 is disposed between the first guide element 11 and the second guide element 13. The third guide element 14 is tubular and disposed coaxially to the first guide element 11. Its wall runs parallel to the axis 12. The round free inner cross section is constant over the longitudinal extension.

Figure 11:
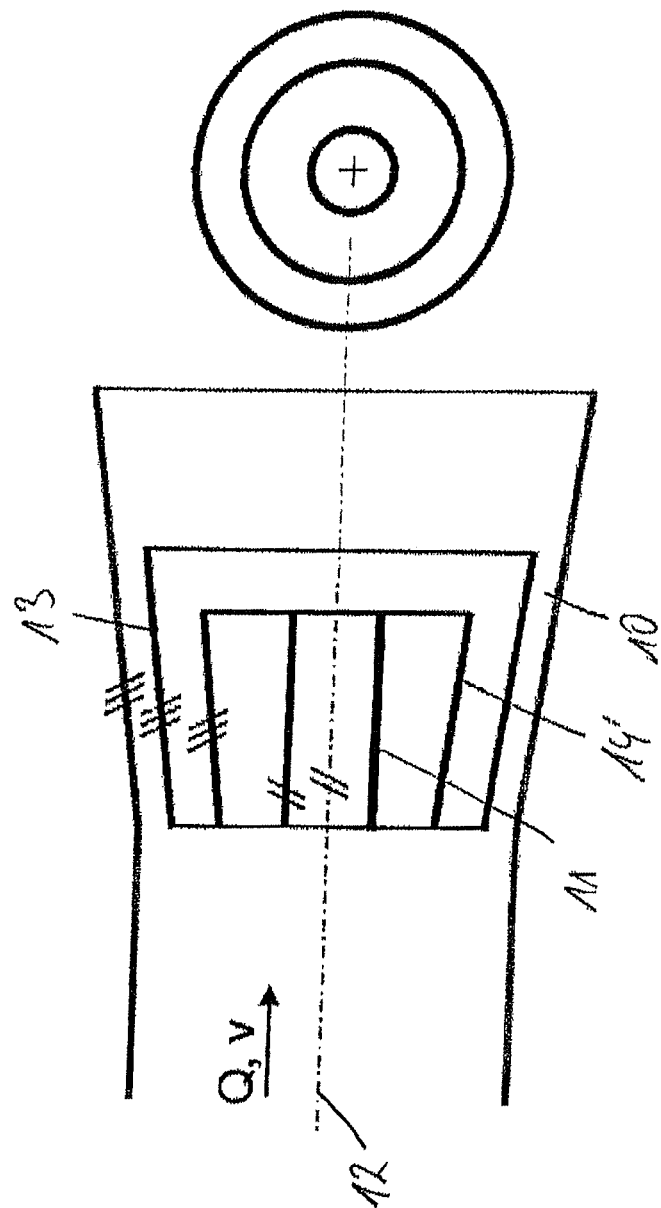
FIG. 11 shows a side view and a front view of a flow rectifier with three guide elements in a another embodiment.

FIG. 11 shows a flow rectifier 10 with the first guide element 11 and the second guide element 13 corresponding to FIG. 10. A third guide element 14' is provided between the first guide element 11 and the second guide element 13. The guide element 14' is designed as a truncated conical pipe and is aligned coaxially to the first guide element 11 and the axis 12. The wall of the third guide element 14' runs parallel to the wall of the second guide element 13. In the axial direction, the longitudinal extension of the third guide element 14' is equal to the longitudinal extension of the first guide element 11. All guide elements lie with their inflow side in the same plane.

Figure 12:
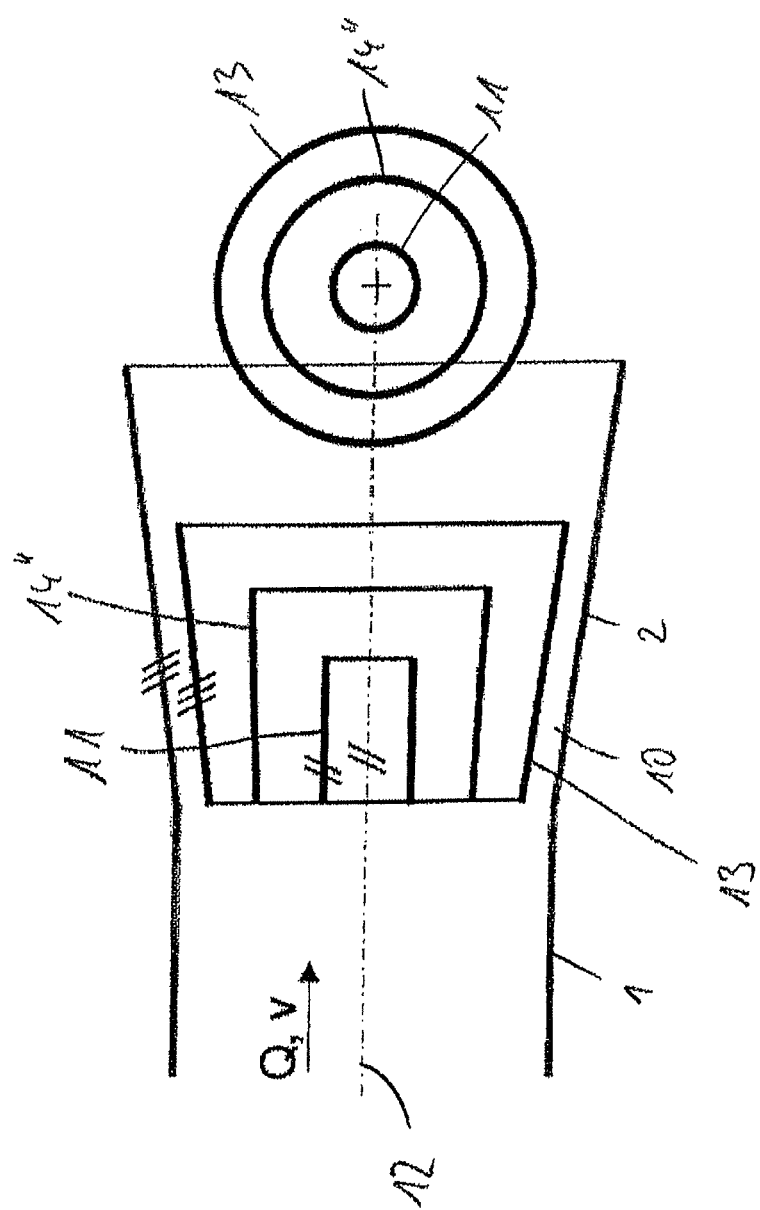
FIG. 12 shows a side view and a front view of a flow rectifier with three guide elements in a further embodiment.

FIG. 12 shows a flow rectifier 10 with the first guide element 11 and the second guide element 13 and a third guide element 14" disposed between them. The third guide element 14 is constructed in the form of a truncated conical pipe and is disposed coaxially to the first guide element 11. The opening cross section in the inflow side lies in the same plane as the inflow sides of the first guide element 11 and the second guide element 13. The wall runs at an angle in relation to the axis 12 which is smaller than the angle of the wall of the second guide element 13, but greater than zero. The wall of the third guide element 14" runs roughly in the bisecting line between the walls of the first guide element 11 and the second guide element 13. The free end of the third guide element 14" lies in the axial direction upstream between the end of the first guide element 11 and the end of the second guide element 13.

Figure 13:
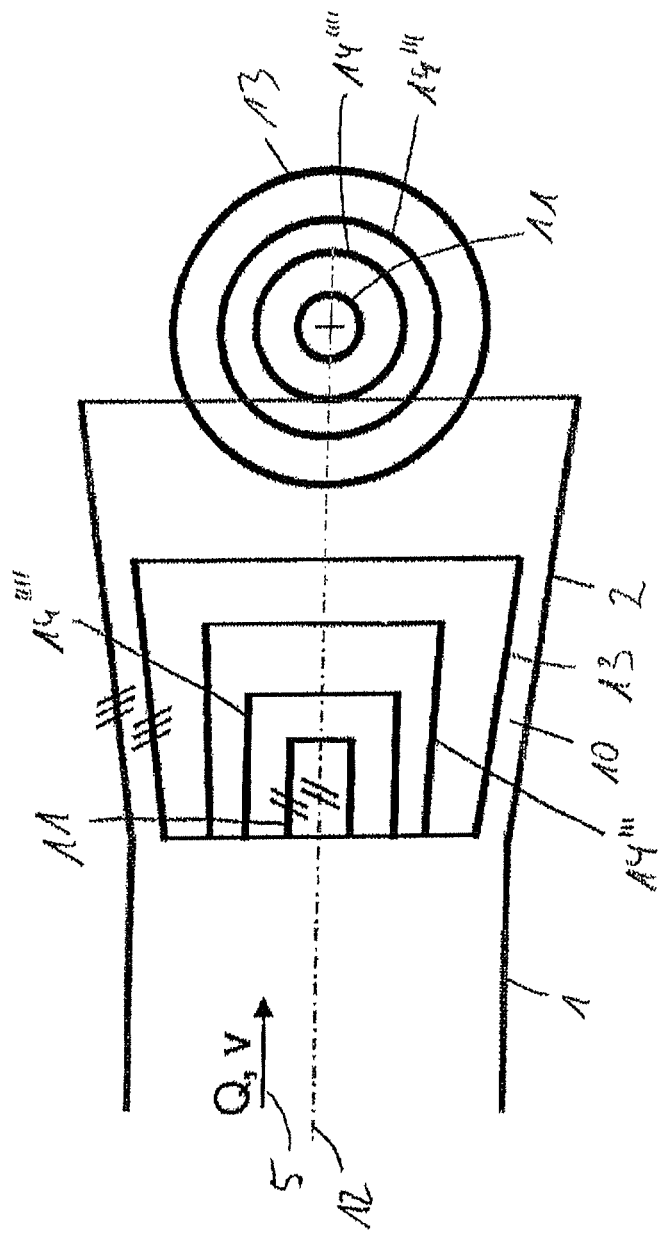
FIG. 13 shows a side view and a front view of a flow rectifier with four guide elements.

FIG. 13 shows a flow rectifier 10 in an inlet cone 2. The flow rectifier comprises the first guide element 11 with a wall parallel to the axis 12 and the second guide element 13 with a wall parallel to the wall of the inlet cone 2. A third guide element 14''' and a fourth guide element 14'''' are provided between the two guide elements 11 and 13.

The third guide element 14''' is shorter in the axial direction than the second guide element 13, but longer than the fourth guide element 14''''. The fourth guide element 14'''' is in turn longer than the first guide element 11. The front sides in the inflow direction lie in one plane. The downstream front sides of the guide elements are staggered.

Whereas the first guide element 11 is cylindrical as in the other embodiments, the third guide element 14''' and the fourth guide element 14'''' are provided with truncated conical walls. The angles of inclination of the walls in relation to the axis 12 lie between the angle of inclination of the conical wall of the second guide element 13 and the angle zero, which is defined by the axis 12 and the wall of the first guide element 11 which is parallel thereto. The angle of opening of the third guide element 14''' is larger than that of the fourth guide element 14'''', but smaller than that of the second guide element 13.

In variants, it is provided for a plurality of guide elements to be disposed between the first and the second guide element. Here, the angle of inclination of the conical wall is preferably proportional to the distance between the wall and the axis 12. The same applies to the guide elements with a non-round cross section, i.e. to embodiments whose downstream end is rectangular, square or provided with rounded corners, see FIGS. 5, 7 and 8.

Figure 14:
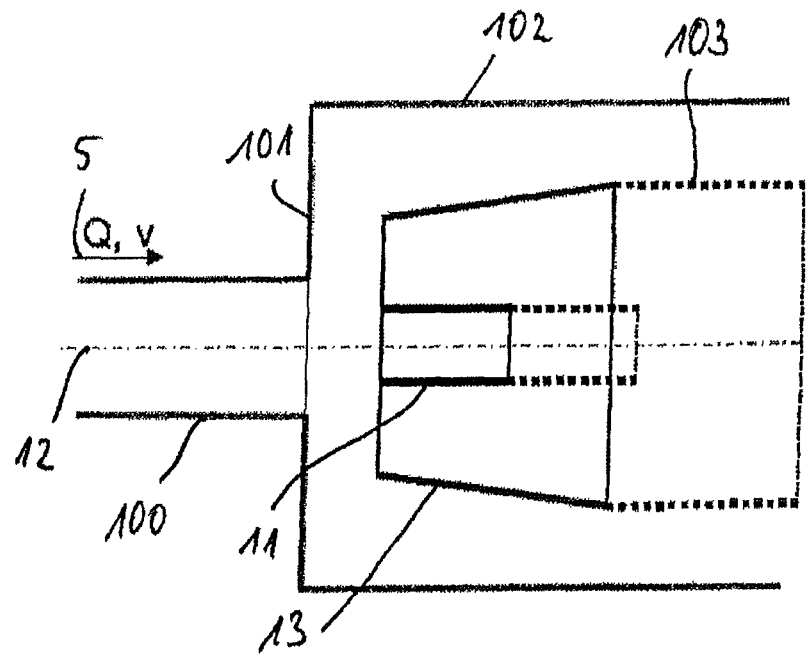
FIG. 14 shows a tenth embodiment of the invention.

FIG. 14 shows a tenth embodiment of the present invention. A channel 100 with a constant, circular diameter extends without a transition in the area of a step 101 to a cylindrical area 102 in which the flow rectifier is disposed with the inner guide element 11 and the outer guide element 13. In a further variant, which is shown by dotted lines, the first guide element 11 is extended beyond the area of the second guide element 13. The second guide element 13 is extended by the attachment of a cylindrical guide element 103 in the direction of flow, wherein the guide element 103 has the diameter of the larger end of the second guide element 13.

Figure 15:
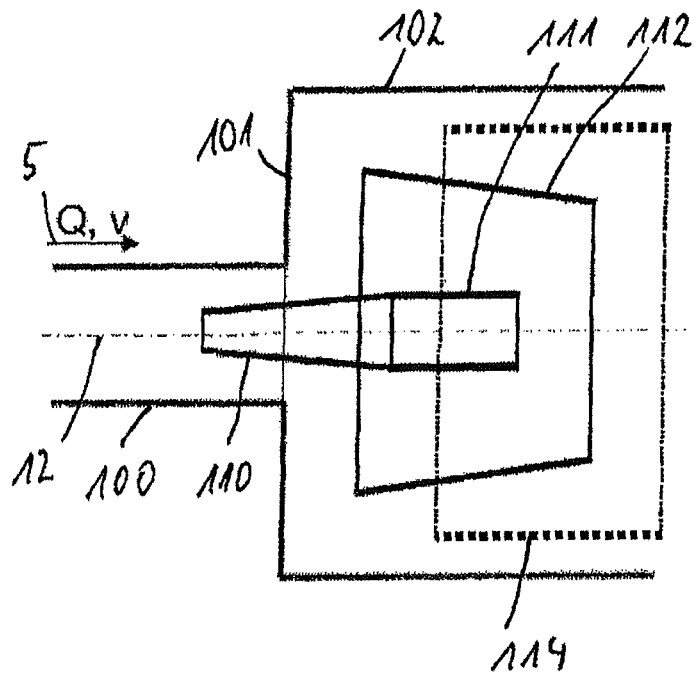
FIG. 15 shows an eleventh embodiment of the invention.

FIG. 15 shows an eleventh embodiment of the present invention. The channel is designed as step-shaped, as illustrated in FIG. 14. An inner guide element 110 has a conical shape with an upstream end with a smaller diameter and a downstream end with a larger diameter. A cylindrical, tubular guide element 111 is connected to the downstream end. A second guide element 112 similarly has a conical shape, but with the larger diameter upstream and the smaller diameter downstream. The upstream end lies in the direction of flow upstream of the transition of the first guide element 110 into the guide element 111. The downstream end of the guide element 112 lies downstream of the guide element 111. A variant is shown by dotted lines. In this variant, an additional cylindrical guide element 114 is provided, which has a constant diameter over its longitudinal extension. The upstream end of the guide element 114, which concentrically surrounds the guide element 112, is disposed between the upstream end and the downstream end of the guide element 112, whereas the downstream end of the guide element 114 lies in the direction of flow downstream of the guide element 112.

Figure 16:
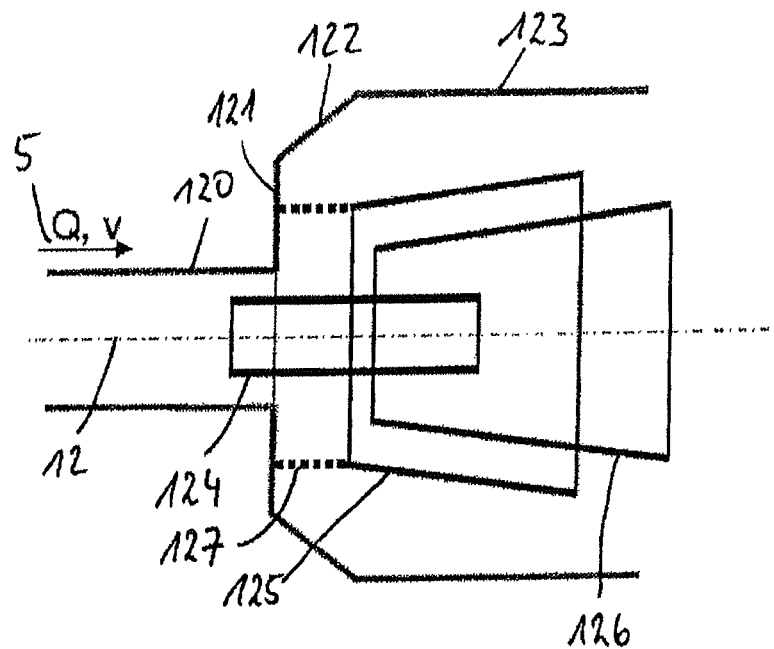
FIG. 16 shows a twelfth embodiment of the invention.

FIG. 16 shows a twelfth embodiment of the present invention. An incoming tubular channel 120 with a constant diameter extends without a transition in the radius in a step 121, and has an adjoining, conically extending area 122, which finally becomes a larger cylindrical section 123. A first guide element 124, which has a tubular shape with a constant diameter, is located, concentric with the axis 12, on the inside of the channel formed in this way. The upstream end of the guide element 124 still lies within the channel 120, whereas the downstream end reaches into the area of the section 123. A second guide element 125 is designed as a conical, tubular element. The upstream end is provided with the smaller diameter, and begins at the transition of the area 122 in the area 123. The downstream end with the larger diameter lies in the area 123, downstream of the first guide element 124. A third guide element 126 is disposed in a radial direction between the first guide element 124 and the second guide element 125. The guide element 126 has a conical shape. The upstream diameter is smaller than the downstream diameter. The upstream end of the guide element 126 lies downstream of the upstream end of the guide element 125, but upstream of the downstream end of the guide element 124. The downstream end of the guide element 126 lies in the direction of flow downstream of the downstream end of the guide element 125. The conical wall of the guide element 125 is designed as substantially parallel to the wall of the guide element 126.

In a variant, which is shown by a dotted line, the guide element 125 is connected at its upstream end to a cylindrical pipe 127, which is attached to the area 121 of the channel.

Figure 17:
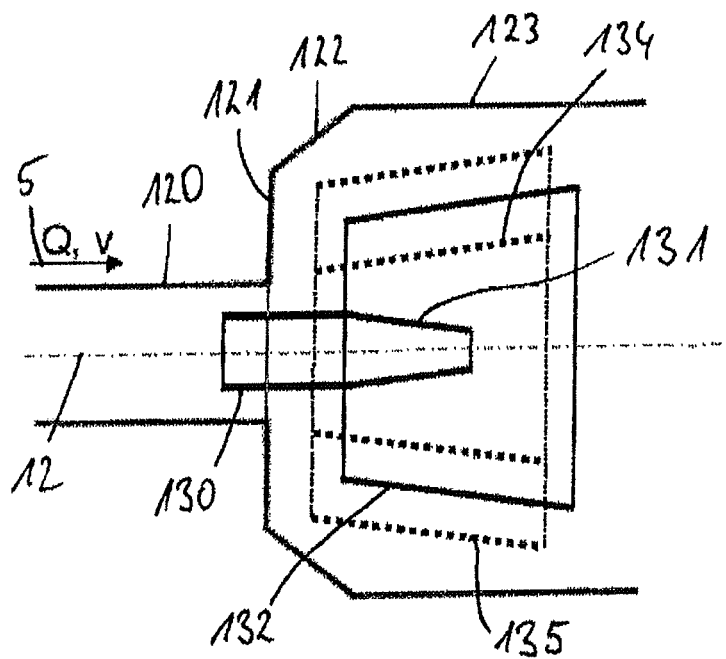
FIG. 17 shows a thirteenth embodiment of the invention.

FIG. 17 shows a thirteenth embodiment of the present invention. A first guide element 130 has a tubular shape with an upstream end which lies within the channel 120. From the upstream end, the guide element 130 is designed in the downstream direction initially with a constant diameter. In the transitional area between the section 122 and the section 123, the cylindrical area of the guide element 130 is adjoined by a conically tapering area 131, which ends downstream with a smaller diameter. The guide element 130 is surrounded by a second guide element 132. The guide element 132 has a conical, tubular shape, and lies with its end with the smaller diameter upstream, whereas the downstream end has the larger diameter. The upstream end lies slightly upstream of the transition between the elements 130 and 131. The downstream end of the guide element 132 lies downstream of the guide element 131. Variants of this embodiment are shown by dotted lines. A conical guide element 134 is disposed concentrically between the guide element 130 and 132. It begins upstream of the guide element 132 and ends with its downstream end between the guide element 131 and the guide element 132. The upstream diameter is smaller than the downstream diameter. The wall runs roughly parallel to that of the guide element 132. A further guide element 135 can be provided which surrounds the guide element 132, lying radially outside. The guide element 135 similarly has a conical shape, and lies with its smaller diameter in the plane of the upstream end of the guide element 134. The downstream end lies in a plane with the downstream end of the guide element 134. The diameter of the guide element 135 is larger than that of the guide element 132, so that the guide element 135 lies in the radial direction of the arrangement between the guide element 132 and the wall 123.

Figure 18:
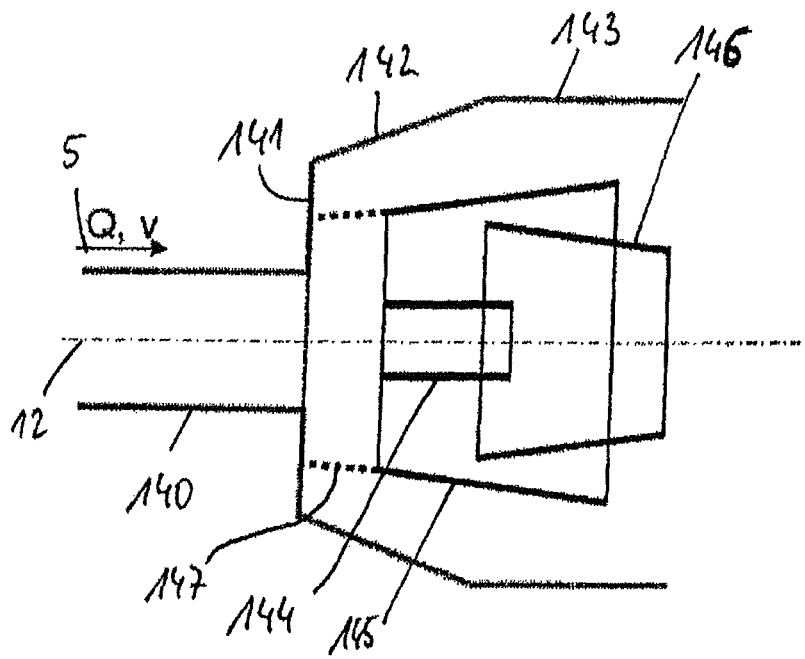
FIG. 18 shows a fourteenth embodiment of the invention.

FIG. 18 shows a fourteenth embodiment of the present invention. A tubular channel 140 undergoes a transition with a radial section 141 in a stepped shape into a conical, extending section 142, which finally adjoins a cylindrical section 143 with a larger diameter.

A first circular, cylindrical guide element 144 begins in the direction of flow in the area of the conically extending section 142 and ends in the cylindrical section 143. A second guide element 145 concentrically surrounds the guide element 144. It has a conical shape, wherein the smaller diameter is disposed upstream and the larger diameter downstream. The upstream end of the guide element 145 lies in a radial plane with the upstream end of the guide element 144. The downstream end of the guide element 145 lies downstream at a distance from the downstream end of the guide element 144. A third guide element 146 is disposed concentrically between the first guide element 144 and the second guide element 145. The third guide element 146 tapers in the direction of flow from an upstream larger diameter to a downstream smaller diameter. The upstream end lies upstream of the downstream end of the guide element 144, whereas the downstream end of the guide element 146 lies in the direction of flow downstream of the downstream end of the guide element 145. In a variant, which is shown by dotted lines, the guide element 145 is attached via a conical connection pipe 147 to the radial section 141 of the channel.

Figure 19:
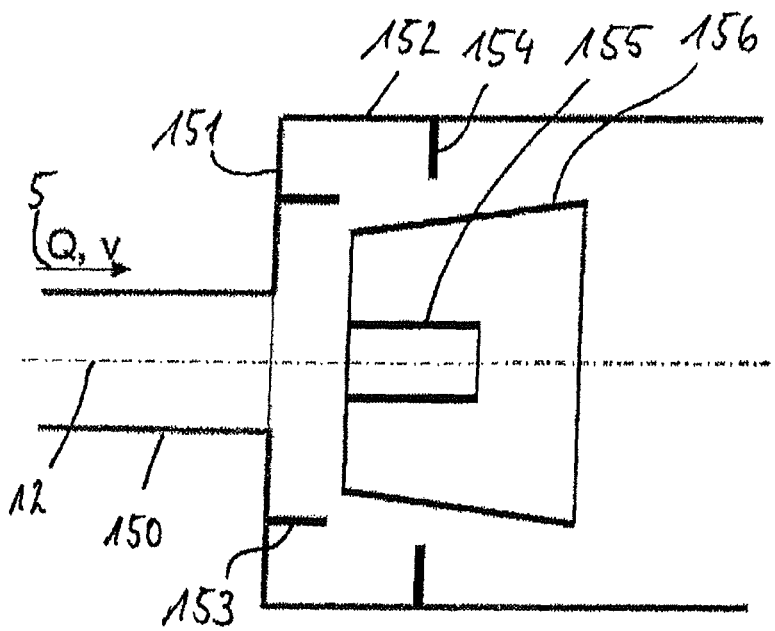
FIG. 19 shows a fifteenth embodiment of the invention.

FIG. 19 shows a fifteenth embodiment of the present invention, A tubular channel 150 with a constant diameter undergoes a transition via a radial section 151 in a stepped shape into a section 152 with a larger diameter. The section 151 is provided with a ring 153, which is disposed concentrically to the axis 12 and which extends into the inner space of the channel, where it ends freely. A further ring 154, in the shape of a circular disc, is disposed downstream in the area of the wall section 152 at a distance from the tubular ring 153. The ring 154 is disposed with its outside on the inside of the wall 152 and reaches in a radial direction into the inner space of the channel, wherein the inner diameter of the ring 154 is larger than the outer diameter of the ring 153.

A first guide element 155 is disposed concentrically to the axis 12 inside the section 152, roughly level with the second ring 154. The guide element 155 is designed as a circular, cylindrical pipe with a constant diameter. A second guide element 156 concentrically surrounds the guide element 155. It has a conical shape. The smaller diameter lies in the upstream direction, whereas the larger diameter lies in the downstream direction. The outside diameter of the second guide element 156 is smaller than the internal diameter of the ring 154. The upstream ends of the guide elements 155 and 156 lie in a radial plane between the rings 153 and 154, whereas the downstream ends of the guide elements 155 and 156 lie downstream of the ring 154. The guide element 156 projects beyond the guide element 155 in the downstream direction.

Figure 20:
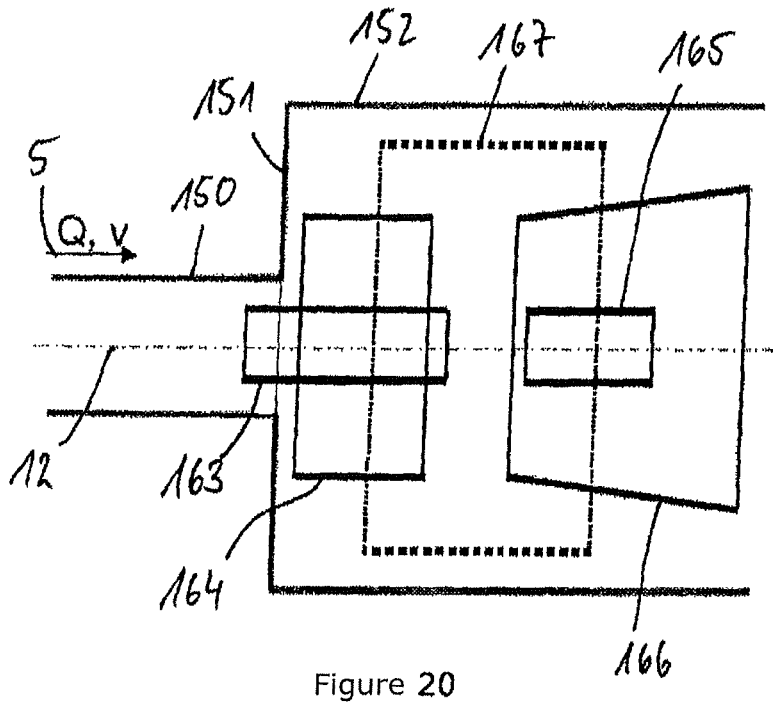
FIG. 20 shows a sixteenth embodiment of the invention.

FIG. 20 shows a sixteenth embodiment of the present invention. The sections 150 to 152 of the outer channel are identical in structure to those from FIG. 19. A first guide element 163 is disposed concentrically to the axis 12. The guide element 163 has a tubular shape with a constant internal diameter. Its upstream end lies within the section 150, whereas the downstream end lies in the area of the section 152. A second guide element 164 concentrically surrounds the guide element 163. It is similarly designed as a pipe with a constant diameter. The diameter of the guide element 164 is roughly four times larger than the diameter of the guide element 163. The diameter of the guide element 164 lies between the diameter of the section 150 and the diameter of the section 152 of the outer channel wall. The upstream end of the guide element 164 lies downstream of the upstream end of the guide element 163. The downstream end of the guide element 164 lies upstream of the downstream end, in the direction of flow, of the guide element 163. A third guide element 165 is disposed concentrically to the axis 12 downstream of the guide element 163 and at a distance from the guide element 163. It is designed as a tubular guide element with a constant diameter. The diameter corresponds to that of the guide element 163. In the axial direction of the axis 12, the guide element 165 is designed as shorter than the guide element 163 and roughly the same length as the guide element 164. A fourth guide element 166 concentrically surrounds the guide element 165. The guide element 166 has a truncated conical shape, wherein the upstream end has the smaller diameter and the downstream end the larger diameter. The upstream end lies between the guide elements 163 and 165, whereas the downstream end of the guide element 166 lies downstream of the downstream end of the guide element 165. The smaller diameter of the guide element 166 lies in the upstream direction. It is roughly as large as the diameter of the cylindrical guide element 164. A variant of the sixteenth embodiment is shown by dotted lines in FIG. 20. A fifth guide element 167 surrounds the guide elements 164 and 166 in such a way that it has a larger outside diameter than these guide elements and partially overlaps both guide elements in the axial direction, so that the guide element 167 encloses the intermediate space between the guide elements 164 and 166. The guide element 167 has a tubular shape with a constant diameter and is aligned parallel to and coaxial to the axis 12. The upstream end of the guide element 167 lies between the upstream end and the downstream end of the guide element 164. The downstream end of the guide element 167 lies between the upstream end and the downstream end of the guide elements 165 and 166.

Figure 21:
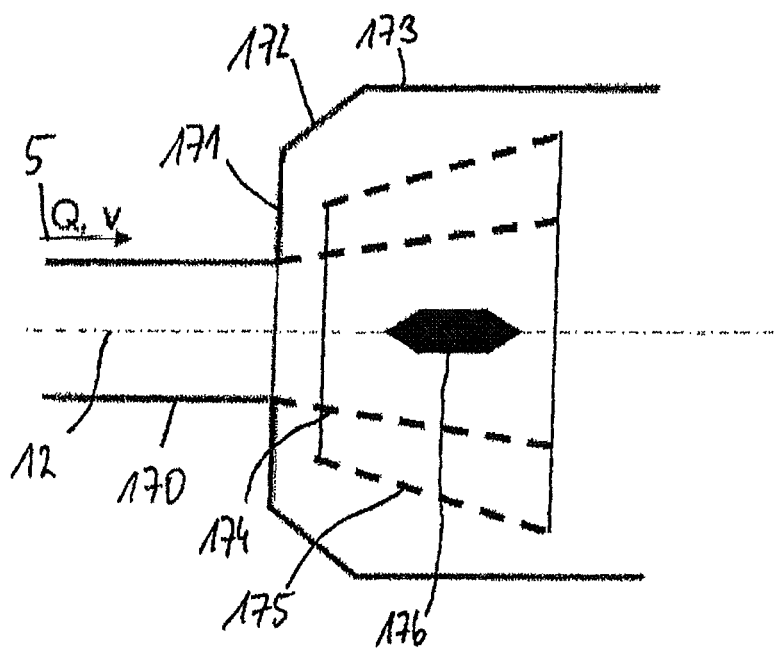
FIG. 21 shows a seventeenth embodiment of the invention.

Finally, FIG. 21 shows a seventeenth exemplary embodiment of the present invention. A channel 170 with a cylindrical, constant diameter undergoes a transition in a radial, disc-shaped section 171 in a stepped shape into a larger diameter. The section 171 is adjoined by a conical section 172, which extends further to a larger diameter in the downstream direction and then adjoins a cylindrical, tubular section 173. A first guide element 174 is disposed on the inside, wherein dotted lines are intended to illustrate perforated plates in this embodiment. The guide element 164 is designed as a conical pipe which, with the upstream end with a smaller diameter, directly adjoins the section 170 and extends to a downstream end with a larger diameter. The guide element 174 is concentrically surrounded by a second guide element 175, which is similarly made from a perforated plate. The guide element 175 has a conical shape and is designed with a larger diameter than the guide element 174. The upstream end with the smaller diameter lies downstream at a distance from the section 171. The downstream larger end of the guide element 175 lies in a radial plane with the downstream end of the guide element 174. A flow body 176, which influences the flow in this area, is disposed within the overlap area of the guide elements 174 and 175 centrally and symmetrically to the axis 12.

Although guide elements with a round cross section have always been described in the embodiments described here in FIGS. 14 to 21, these may also be square, rectangular, or provided with rounded corners in adaptation to the embodiments described in FIGS. 3 and 5. In particular, the walls of the guide elements may be made from a continuous steel plate. However, as indicated in FIG. 21, they may also be made from a perforated plate, wherein the perforated plate may have parallel slots, triangular indents or elliptical indents.

Furthermore, the devices described here can also be used for the homogenisation of flow profiles in pipes which do not have an abruptly or continuously increasing internal diameter, but which have a constant diameter. Finally, the devices can also be used in the reverse direction of flow, i.e., for example, in FIGS. 14 to 21 with a direction of flow from right to left. The channel then becomes narrower from a larger to a smaller diameter.

In practice, the use of the flow rectifiers described here produces a homogenisation of the speeds of the flow paths which are formed in the UV reactor 3 upstream of the UV radiators 6. Compared with the uninfluenced flow, the fast flow paths are slowed down, whereas the slow flow paths are accelerated. This produces a more even irradiation of the liquid flow. Every liquid volume element receives the same UV dosage when it passes through the UV reactor. The differences are in any event reduced. As a result, the electric power applied to the UV reactor can be reduced for the same volume flow.

The invention claimed is:

1. A channel for an ultraviolet (UV) irradiation device, in which the UV irradiation device is disposed in a closed channel, wherein a flow rectifier with at least one inner first guide element having two open ends and an axially extending fluid passageway defined therebetween, and at least one outer second guide element is disposed in the channel upstream of the UV irradiation device, wherein the outer second guide element surrounds the inner first guide element and the outer second guide element is disposed at a distance from an outer wall of the channel.

2. The channel according to claim 1, wherein the inner guide element is a substantially circular, cylindrical pipe and the outer guide element runs substantially parallel to the outer wall.

3. The channel according to claim 1, wherein an inlet cone is provided in the direction of flow upstream of a UV reactor.

4. The channel according to claim 3, wherein the inlet cone, as part of the wall of the channel, changes a cross section of the channel from an incoming pipeline cross section to a cross section of the UV reactor.

5. The channel according to claim 3, wherein the inlet cone, as part of the wall of the channel, increases a cross section of the channel from an incoming pipeline cross section to a cross section of the UV reactor.

6. The channel according to claim 3, wherein the inlet cone, as part of the wall of the channel, reduces a cross section of the channel from an incoming pipeline cross section to a cross section of the UV reactor.

7. The channel according to claim 3, wherein the flow rectifier is disposed in the inlet cone.

8. The channel according to claim 3, wherein a transition from the channel to the UV reactor is designed as a step.

9. The channel according to claim 3, wherein the outer guide element is adapted to a geometric shape of the inlet cone.

10. The channel according to claim 1, wherein the outer guide element has a circular cross section.

11. The channel according to claim 1, wherein the outer guide element has a square or rectangular cross section with either rounded corners or rectangular corners.

12. The channel according to claim 1, wherein at least a third guide element is disposed between the first guide element and the second guide element.

13. The channel according to claim 12, wherein a wall of the third guide element is aligned in relation to an axis of symmetry of an arrangement at an angle which lies between the first guide element and the second guide element.

14. The channel according to claim 1, wherein the first guide element is shorter than the second guide element in an axial direction of the UV irradiation device, corresponding to a direction of flow of water.

15. The channel according to claim 1, wherein upstream ends of the guide elements are disposed in one radial plane, and the downstream ends of the guide elements lie in different radial planes.

16. The channel according to claim 1, wherein an axial extension of the guide elements is equally long.

* * * * *